US011873776B1

(12) United States Patent
Marrack et al.

(10) Patent No.: US 11,873,776 B1
(45) Date of Patent: Jan. 16, 2024

(54) FUEL INJECTOR DRIVE SYSTEM

(71) Applicant: Caterpillar Inc., Peoria, IL (US)

(72) Inventors: Andrew O. Marrack, Peoria, IL (US); Bradley D. Ferguson, Dunlap, IL (US); Eric L. Schroeder, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/816,930

(22) Filed: Aug. 2, 2022

(51) Int. Cl.
*F02D 41/22* (2006.01)
*F02D 41/40* (2006.01)
*F02D 41/02* (2006.01)
*F02D 41/20* (2006.01)

(52) U.S. Cl.
CPC ........... *F02D 41/02* (2013.01); *F02D 41/221* (2013.01); *F02D 41/401* (2013.01); *F02D 2041/2058* (2013.01); *F02D 2041/2089* (2013.01); *F02D 2041/2093* (2013.01); *F02D 2041/224* (2013.01)

(58) Field of Classification Search
CPC ...... F02D 41/20; F02D 41/221; F02D 41/401; F02D 2041/2058
USPC ................................ 123/472, 478, 479, 490
See application file for complete search history.

(56) References Cited

U.S. PATENT DOCUMENTS

| | | | | |
|---|---|---|---|---|
| 6,113,014 | A | 9/2000 | Coldren et al. | |
| 6,167,869 | B1 | 1/2001 | Martin et al. | |
| 10,941,738 | B1 | 3/2021 | Puckett et al. | |
| 2011/0132321 | A1 * | 6/2011 | Pursifull | F02D 41/0082 123/299 |
| 2021/0254589 | A1 | 8/2021 | Rottengruber et al. | |

FOREIGN PATENT DOCUMENTS

| | | | |
|---|---|---|---|
| WO | 20180141535 | A1 | 5/2018 |

* cited by examiner

*Primary Examiner* — Erick R Solis
(74) *Attorney, Agent, or Firm* — Bookoff McAndrews, PLLC

(57) ABSTRACT

A fuel injection system includes a first fuel injector having a first electronically-controlled valve and a first injection valve configured to inject fuel when the first electronically-controlled valve is actuated. A second fuel injector has a second electronically-controlled valve and a second injection valve configured to inject fuel when the second electronically-controlled valve is actuated. The fuel injection system also includes a single fuel injector driver configured to actuate the first electronically-controlled valve and the second electronically-controlled valve.

20 Claims, 4 Drawing Sheets

FUEL INJECTOR DRIVE SYSTEM

TECHNICAL FIELD

The present disclosure relates generally to methods and systems for internal combustion engine components and, more particularly, to systems and methods for a fuel injection system with multiple solenoids.

BACKGROUND

Fuel injectors for internal combustion engines are designed to inject a controllable amount of fuel. While some fuel injectors include a single electronically-controlled valve, such as a solenoid valve, other fuel injectors include multiple electronically-controlled solenoid valves. As an example, some injectors include a first valve that facilitates pressurization of fuel within the fuel injector and a second valve that facilitates injection of this pressurized fuel. These valves may be individually controlled to operate the separate valves of a particular fuel injector at different times. For example, a valve that enables fuel pressurization might be activated immediately before a valve that controls injection is activated.

While injectors with individually-controlled valves offer advantages, these valves also increase the cost and complexity of the fuel injection system. For example, each electronically-controlled valve is connected to a dedicated drive circuit that supplies energy at appropriate times. Thus, engine systems can require two drive circuits for each fuel injector. To accommodate the numerous drive circuits, some engines include two separate control modules, these modules being in communication with each other to coordinate fuel injection events during the operation of the engine. While these systems are effective and can accurately operate an internal combustion engine, the use of multiple control modules increases the number of possible failure points and further increases cost.

An exemplary fuel injector is described in U.S. 2021/0254589 A1 ("the '589 publication") to Rottengruber et al. The fuel injector described in the '589 publication includes two solenoids that allow the injection of fuel and an additional fluid. These different solenoids are located together within a single fuel injector. While the injector described in the '589 publication may be useful for independently injecting fuel and another fluid, such as water, it does not enable control of two solenoid-driven valves in different fuel injectors via a single drive circuit.

The systems and methods of the present disclosure may solve one or more of the problems set forth above and/or other problems in the art. The scope of the current disclosure, however, is defined by the attached claims, and not by the ability to solve any specific problem.

SUMMARY

In one aspect, a fuel injection system may include a first fuel injector having a first electronically-controlled valve and a first injection valve configured to inject fuel when the first electronically-controlled valve is actuated. A second fuel injector may have a second electronically-controlled valve and a second injection valve configured to inject fuel when the second electronically-controlled valve is actuated. The fuel injection system may also include a single fuel injector driver configured to actuate the first electronically-controlled valve and the second electronically-controlled valve.

In another aspect, a fuel injection system may include a first fuel injector having a spill valve and a control valve, a second fuel injector having a spill valve and a control valve, and a fuel injector drive circuit electrically connected to the spill valve of the first fuel injector and to the control valve of the second fuel injector to supply current for both the spill valve and for the control valve. The fuel injection system may also include an electronic control module configured to generate a command for energizing the fuel injector drive circuit, and identify an abnormality in the first fuel injector or the second fuel injector based on energy supplied with the fuel injector drive circuit.

In yet another aspect, a fuel injection method may include causing an injection of fuel with a first fuel injector by generating a command to actuate a first valve of the first fuel injector with a first injector driver and generating a command to actuate a second valve of the first fuel injector with a second injector driver. The method may also include causing an injection of fuel with a second fuel injector by generating a command to actuate a first valve of the second fuel injector and generating a command to actuate a second valve of the second fuel injector, wherein the command to actuate the first valve or the command to actuate the second valve, of the second fuel injector, is generated with the first injector driver.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic.

Figure 1:
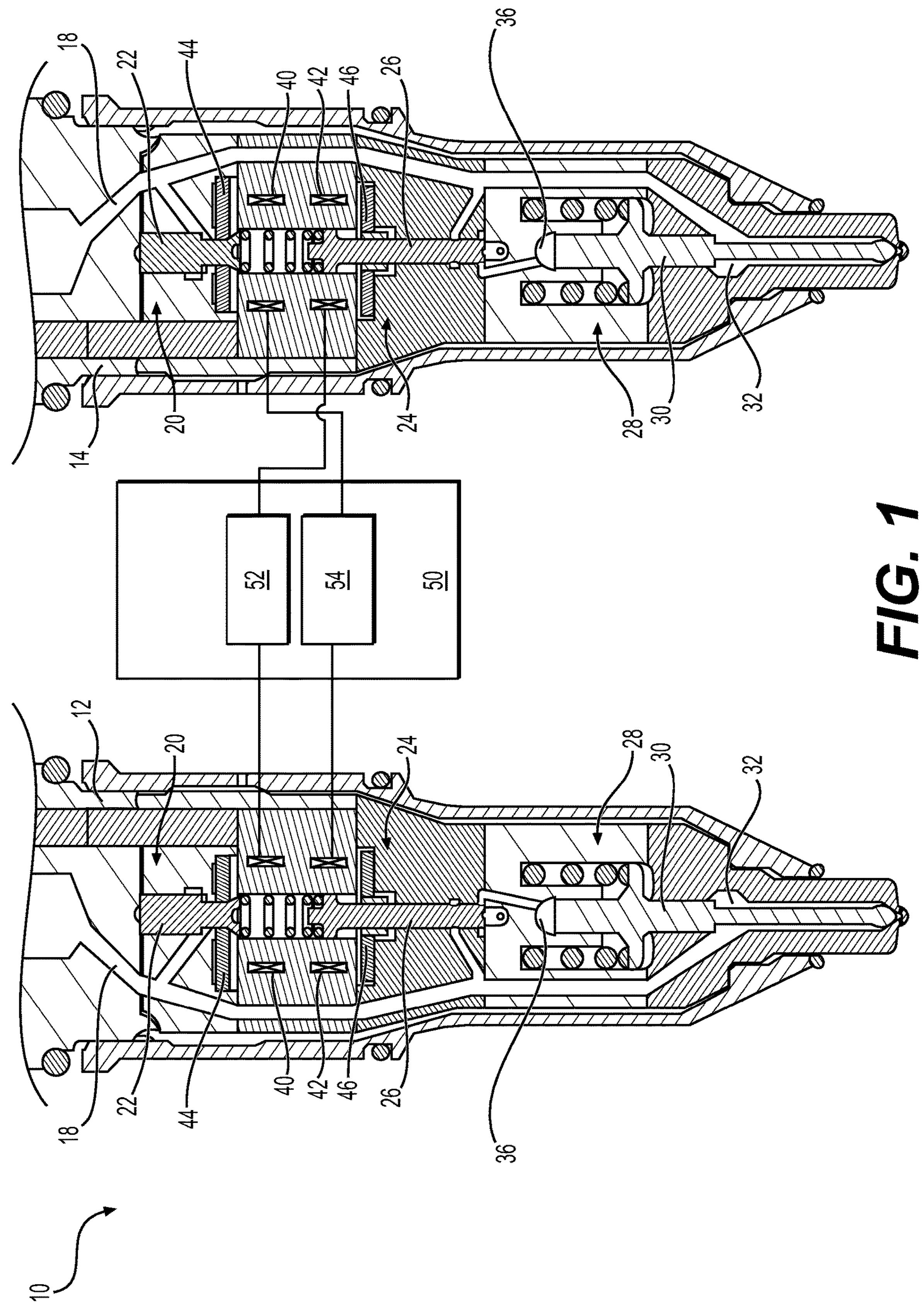
FIG. 1 is a schematic cross-sectional view of a fuel injection system, according to aspects of the disclosure.

FIG. 1 illustrates an exemplary fuel injection system 10 according to aspects of the present disclosure. Fuel injection system 10 may include a plurality of fuel injectors, including a first fuel injector 12 and a second fuel injector 14, and an electronic control module (ECM) 50 that includes a plurality of injector drivers 52 and 54 that are electrically connected to valves of injectors 12 and 14. Injectors 12 and 14 may be installed in an internal combustion engine (not shown) having a plurality of engine cylinders. For example, suitable engines may include four, six, eight, ten, twelve, or twenty cylinders. Each pair of cylinders may have a respective pair of fuel injectors 12 and 14 installed therein.

Fuel injector 12 and fuel injector 14 may be designed to be identical to each other (i.e., fuel injectors 12 and 14 may be fuel injectors of the same type, such as fuel injectors having the same model number). Therefore, while some references herein are to fuel injector 12 alone, as understood, the description of fuel injector 12 also applies to fuel injector 14, except when indicated otherwise.

Fuel injector 12 may be a mechanically-actuated electronically-controlled unit injector including a body that houses a camshaft-driven piston (not shown), a fuel passage 18 to receive fuel pressurized when this piston is pressed by the camshaft, an electronically-controlled spill valve 20, an electronically-controlled control valve 24, and an injection valve 28. Spill valve 20 may be a normally-open valve including a valve member 22 that is movable between an open position and a closed position. A spring member may act to bias spill valve member 22 to the open position. When the valve member 22 is in the open position, spill valve 20 may allow fuel to drain and return to the fuel supply system. When in the closed position, spill valve 20 may enable pressurization of fuel via the piston of injector 12. Spill valve 20 may include a spill valve solenoid 40 for actuating spill valve member 22 due to movement of a spill valve armature 44 to which member 22 is connected. Spill valve solenoid 40 may be energized in response to commands from ECM 50, the energized state acting to move spill valve 20 to the closed position.

Control valve 24 may be connected between pressurized fuel supply passage 18 and a control chamber 36. Control valve 24 may have a non-injection position and an injection position associated with a control valve member 26. When in the non-injection position, valve member 26 may enable fluid communication between control chamber 36 and fuel that is pressurized with a piston, filling chamber 36 with fuel. When control valve member 26 is in the injection position, control chamber 36 may be depressurized by allowing fuel in chamber 36 to drain from fuel injector 12 to the fuel supply system. Control valve 24 may be brought to the injection position due to electromagnetic force created by supplying current to control valve solenoid 42.

Injection valve 28 may be a one-way valve formed with a spring, an injection valve member 30 biased by the spring, and control chamber 36. An upper hydraulic surface of injection valve member 30 may face control chamber 36. When high-pressure fluid is present in control chamber 36, injection valve member 30 may be secured in a closed position, even when pressurized fuel is present in injection chamber 32, due to the ability of fluid within control chamber 36 to block movement of injection valve member 30. When injection is desired, fluid may be permitted to drain from control chamber 36, as described below, allowing pressurized fuel to lift injection valve member 30 by acting on a lower hydraulic surface of injection valve member 30.

ECM 50 may be an electronic control module that controls one or more aspects of fuel injection system 10, including the behavior of an internal combustion engine. ECM 50 may be implemented as a single control unit that controls multiple aspects of system 10 and, in particular, control of every fuel injector present in system 10 (e.g., every injector 12, 14 installed in the internal combustion engine of system 10). ECM 50 may be enabled, via programming, to generate commands that control fuel injection events, including commands for a fuel injector drive circuit (also referred to herein as a "fuel injector driver" or "injector driver") that includes solenoids of two different fuel injectors. ECM 50 may also be configured, via programming, to monitor performance of individual valves of the fuel injectors and, based on fuel injector currents, determine when an individual valve connected to a fuel injector driver with another valve operates abnormally (e.g., due to an open circuit, a short circuit, etc.). ECM 50 may be configured to generate a notification based on an identified abnormality, this notification identifying the fuel injector in which the abnormality occurred, and if desired, the particular valve of the fuel injector that experienced the variability. If desired, ECM 50 may also be configured to monitor valve arrival times and/or valve return times based on current induced by motion of spill valve member 22 and control valve member 26. Based on the valve return time of spill valve member 22, for example, ECM 50 may be configured to adjust timing of valve 20 in one or more injection events.

ECM 50 may embody a single microprocessor or multiple microprocessors that receive inputs and generate outputs. ECM 50 may include a memory, a secondary storage device, a processor such as a central processing unit, or any other means for accomplishing a task consistent with the present disclosure. The memory or secondary storage device associated with ECM 50 may store data and software to allow ECM 50 to perform its functions, including the functions described with respect to fuel injection method 400, described below. Numerous commercially available microprocessors can be configured to perform the functions of ECM 50. Various other known circuits may be associated with ECM 50, including signal-conditioning circuitry, communication circuitry, and other appropriate circuitry. For example, ECM 50 may include circuitry for communicating wireless and/or via wired connections to a display device within system 10 or at a remote location, so as to enable ECM 50 to cause display of notifications, as described below.

Every fuel injector of system 10 (e.g., every fuel injector installed in a particular internal combustion engine) may be connected to a single ECM 50. Thus, ECM 50 may include a series of electrical connections or "pins" that enable ECM 50 to electrically drive and monitor each fuel injector. An example of these connections is represented below as Table 1.

Table 1 shows spill valve and control valve connections for an exemplary internal combustion engine having six cylinders. In system 10, including in this example, each injector 12 may be paired with another injector 14 such that each valve of the first injector 12 of the pair is electrically connected with a valve of the second injector 14. In particular, spill valve 20 of each fuel injector may be connected together, with a common injector driver, to a respective control valve 24 of a second injector. These commonly-connected valve pairs are represented by each row in Table 1. As understood, while injector valves may be paired such that a spill valve is connected to a control valve, it is also possible to connect spill valve pairs to each other, and to connect control valve pairs to each other. As shown in Table 1, each solenoid-driven valve may be connected to an individual high side connection, while a plurality of solenoids may share a particular low side connection.

Each cylinder of a six-cylinder engine is represented with a number in Table 1, with "1" representing an injector in a first cylinder, "2" representing an injector in a second cylinder, etc. In the example of a four-stroke engine, a crankshaft may perform two full rotations in an engine cycle to perform intake, compression, combustion, and exhaust strokes. Thus, in an exemplary six-cylinder engine, each cylinder may be 120 crankshaft degrees from another cylinder, such that cylinder 2 (the second cylinder in the engine's firing order) is 120 crankshaft degrees from cylinder 1 (the first cylinder in the engine's firing order), cylinder 3 (the third cylinder in the engine's firing order) is 240 crankshaft degrees from cylinder 1, etc.

TABLE 1

| First Connection | Second Connection | Spill Valve | Control Valve |
|---|---|---|---|
| High side connection 1 | Low side connection 1 | Injector no. 1 | Injector no. 4 |
| High side connection 2 | Low side connection 1 | Injector no. 6 | Injector no. 3 |
| High side connection 3 | Low side connection 1 | Injector no. 2 | Injector no. 5 |
| High side connection 4 | Low side connection 2 | Injector no. 3 | Injector no. 6 |
| High side connection 5 | Low side connection 2 | Injector no. 5 | Injector no. 2 |
| High side connection 6 | Low side connection 2 | Injector no. 4 | Injector no. 1 |

As can be seen in Table 1, in at least one configuration, the spill valve of a particular injector (e.g., injector 12) may be connected with a control valve of an injector that is 360 crankshaft degrees away from this injector (e.g., injector 14). For example, spill valve 20 of injector 12 for cylinder 1 may be connected to control valve 24 of injector 14 for cylinder 4, resulting in paired injectors 12 and 14 being 360 crankshaft degrees away from each other. However, it may be possible to electrically connect pair of solenoid-actuated valves in other manners, provided that the valves are installed in injector pairs that are more than about 135 crankshaft degrees and less than about 585 crankshaft degrees from each other, or preferably more than about 270 camshaft degrees and less than about 450 camshaft degrees from each other.

As understood, the pattern provided in Table 1 may be applicable to engines having any number of cylinders and injectors, including engines having 16 cylinders, 20 cylinders, or more. Such engines may have 16 fuel injectors or 20 fuel injectors, respectively. In these engines, a single ECM 50 may be employed to drive an entirety of the fuel injectors present. In these and other configurations, it may be desirable to provide ECM 50 with a reduced power output (e.g., as measured in watts) in comparison to corresponding engines that employ two separate electronic control units. This may, for example, reduce the amount of "wasted" current and improve energy efficiency.

Figure 2:
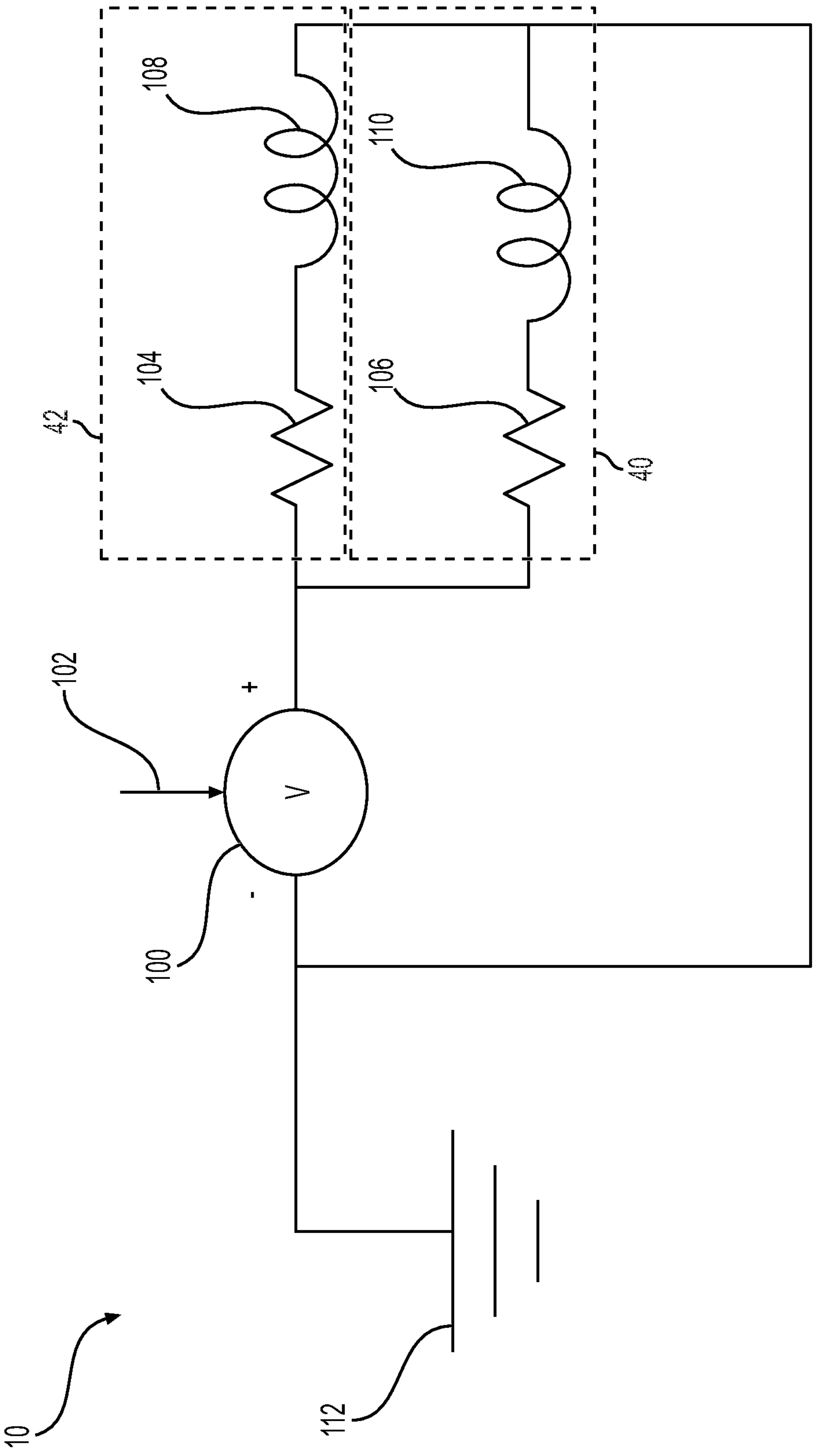
FIG. 2 is a diagram illustrating a drive circuit for paired fuel injector valves useful in the fuel injection system of FIG. 1, according to aspects of the disclosure.

FIG. 2 is a diagram illustrating an exemplary drive circuit for driving valves of a pair of different fuel injectors 12 and 14. The drive circuit may include a voltage source 100 configured to receive a voltage command 102, a first solenoid (e.g., control valve solenoid 42) having a first resistance 104 and a first inductance 108, and a second solenoid (e.g., spill valve solenoid 40) having a second resistance 106 and a second inductance 110. The drive circuit may also include a ground potential 112.

Voltage source 100 may be responsive to voltage commands 102 issued by ECM 50. These commands may selectively open and close the drive circuit such that, when the drive circuit is closed, voltage source 100 is connected and current flows through both solenoid 40 and solenoid 42. When both solenoids 40 and 42 are acting in an intended manner, the flow of current may energize both solenoids simultaneously. Despite the energization of two solenoids, fuel may only be injected by one of the two paired fuel injectors, due to the crankshaft separation of these injectors. Current may be impacted by resistance 104, resistance 106, inductance 108, and inductance 110. The flow of current, and in particular, the rise time of current within the drive circuit during the application of an approximately constant voltage, may be monitored to facilitate diagnostics of the valves associated with solenoids 40 and 42.

In some aspects, due to differences in resistances 104 and 106 and/or differences in inductances 108 and 110 which are each known to ECM 50 (e.g., via programming), ECM 50 may be configured to identify changes in the behavior of current through the drive circuit which indicate abnormalities in one of the valves of injectors 12 and 14. For example, the resistance of the drive circuit as a whole may be less than resistance 104 of control valve solenoid 42 and resistance 106 of spill valve solenoid 40. Additionally, ECM 50 may be programmed based on resistance 104 being smaller than resistance 106. In some aspects, ECM 50 may be configured, based on these known differences, to identify an abnormality, such as a fault, in spill valve 20 and control valve 24, and to display the identified abnormality in a display for an operator, as an engine diagnostic code, as an audio notification, etc. In some configurations, ECM 50 may communicate the cylinder, injector, and valve information associated with an abnormal condition to an operator of the machine and/or a supervisor for a plurality of machines.

ECM 50 may also be configured to detect valve return times based on current induced in the injector drive circuit. For example, the return of spill valve member 22 at the end of actuation may induce current, a peak of this current corresponding to the return time. This return time of valve member 22 may occur after control valve member 26 has returned and after the termination of current generated with command 102. Thus, induced current within the drive circuit after the termination of command 102 may correspond to valve member 22, allowing ECM 50 to compare a detected return timing to a desired return timing. Based on the detected return timing, ECM 50 may modify a future command 102 to provide improved control over spill valve 20. ECM 50 may also be configured to identify abnormalities, or other conditions, such as valve sticking in spill valve 20.

Industrial Applicability

System 10 may be useful in any internal combustion engine, such as liquid fuel (e.g., diesel, gasoline, etc.) engines, gaseous fuel engines, or dual-fuel engines (engines configured to combust both liquid fuel and gaseous fuel). System 10 may be utilized for generating power in a stationary machine (e.g., a generator or other electricity-generating device), in a mobile machine (e.g., an earthmoving device, a hauling truck, a drilling machine, etc.), or in other applications in which it is beneficial to install a plurality of fuel injectors in an internal combustion engine and connect two or more of these fuel injectors such that the fuel injectors are driven by a single injector driver.

During an injection event, the pressure of fuel within pressurized fuel passage 18 (FIG. 1) may increase when spill valve 20 is closed and a camshaft drives the piston within injector 12 downward. Control valve 24 may control whether fluid (e.g., fuel) within control chamber 36 is pressurized.

When fuel injection is desired in a particular cylinder of system 10, ECM 80 may generate a first drive circuit command. For example, ECM 80 may generate a first voltage command 102 (FIG. 2), supplying electrical energy to a first valve of injector 12 and a second valve of injector 14 via drive circuit 52 (FIG. 1). This energy may actuate the first valve of injector 12, spill valve 20, moving spill valve member 22 of injector 12 to the closed position. The energy may also actuate control valve 24 of injector 14. However, as pressurized fuel is not present in injector 14 at this time, fuel is not injected by injector 14 by this first command 102.

ECM 50 may generate a second voltage command 102 for injector driver 54 while fuel is pressurized in passage 18 of injector 12. This second command 102 may cause valve member 26 in control valve 24 of injector 12 to move to the injection position. This actuation may allow fluid within control chamber 36 to drain via a low-pressure fluid passage (e.g., a fluid drain). Pressurized fuel within injection chamber 32 of injector 12 may lift injection valve member 30 and permit injection of fuel.

Figure 3:
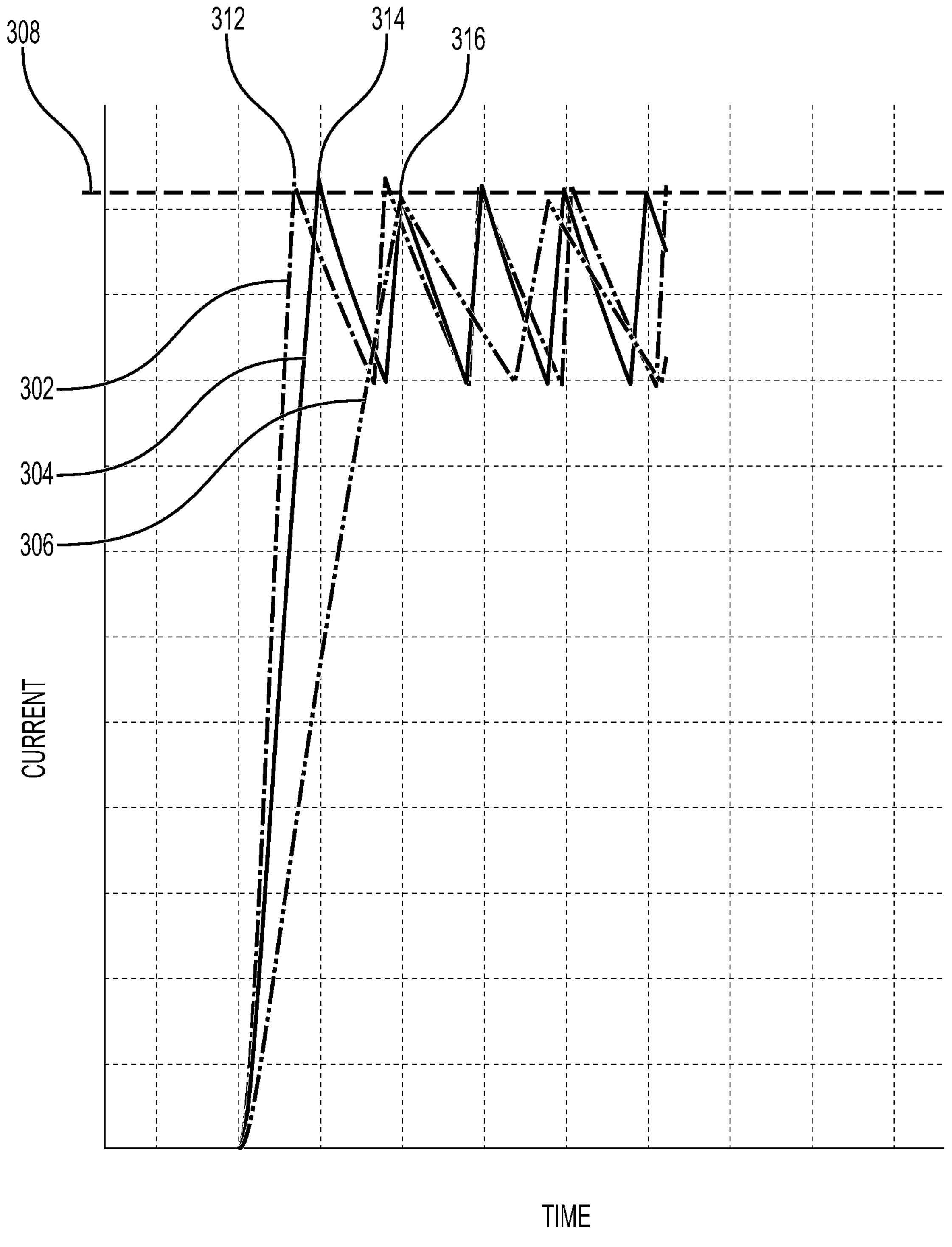
FIG. 3 is a chart showing exemplary current rise times under different conditions for the system of FIG. 1, according to aspects of the disclosure.

FIG. 3 is a chart showing exemplary current rise times under three different conditions of injector 12. A first waveform 302 represents the flow of current in the injector driver when both solenoid 40 and solenoid 42 (FIG. 2) operate in an expected manner and receive energy. A second waveform 304 represents the flow of current in the drive circuit when control valve 24 operates normally and spill valve 20 operates abnormally (e.g., when spill valve 20 experiences an open circuit condition or a short circuit condition). A third waveform 306 represents the flow of current in the drive circuit when spill valve 20 operates normally and control valve 24 operates abnormally (e.g., when control valve 24 experiences an open or short circuit).

ECM 50 may be configured to monitor the rise time of the current waveform to determine the time at which the waveform reaches a predetermined current threshold 308. As shown in FIG. 3, a first rise time 312 may indicate that both valves are operating normally, enabling flow of current through both parallel paths of the drive circuit and energizing both solenoids 40 and 42. A second rise time 314 may correspond to flow of current through only solenoid 42 associated with control valve 24, which may have a lower resistance 106 as compared to resistance 104 of solenoid 40. A third rise time 316 may correspond to flow of current through solenoid 40, only, of spill valve 20 due to the increased resistance 104 of solenoid 40.

As shown in FIG. 3, threshold 308 may correspond to an approximately maximum current level at which ECM 50 discontinues the connection of voltage source 100, allowing current to decrease. However, other current values (e.g., lower current values) may be used for threshold 308. In some aspects, the amplitude of threshold 308 may be based on the expected rise times when one valve operates abnormally so as to enable accurate detection of this abnormality. Each rise time 312, 314, 316 may be programmed as ranges or time periods within ECM 50. Thus, first rise time 312 may correspond to a first or earliest period of time, second rise time 314 may correspond to a somewhat longer second period of time, and third rise time 316 may correspond to yet further period of time. In addition to detecting faults in a particular injector, ECM 50 may be configured to identify failures due to the injector driver (e.g., short circuit or open conditions) due to detection of a rise time that is earlier than, or later than, any of the ranges associated with first rise time 312, second rise time 314, and third rise time 316.

Figure 4:
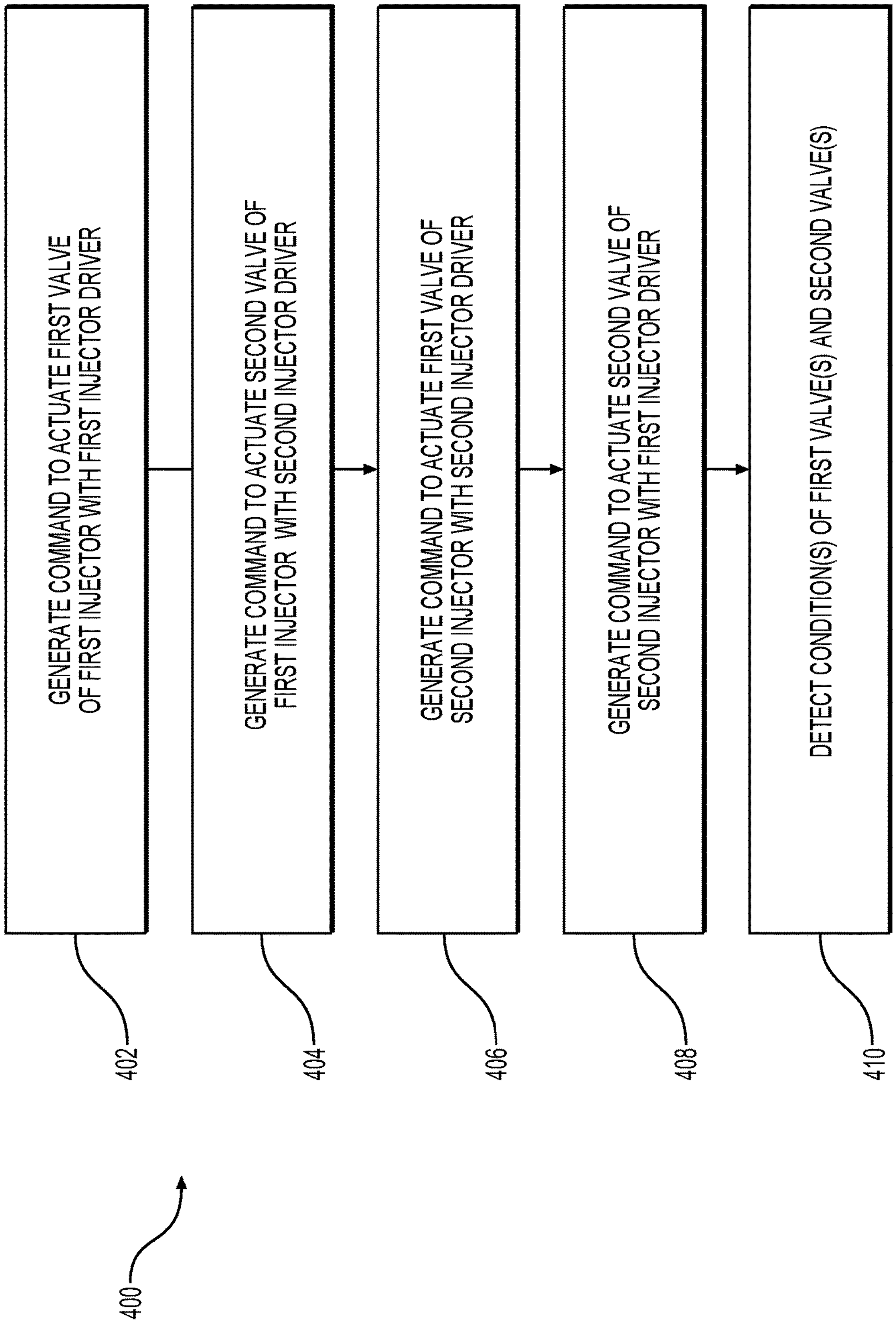
FIG. 4 is a flowchart depicting an exemplary fuel injection method, according to aspects of the disclosure.

FIG. 4 shows a flowchart illustrating an exemplary fuel injection method 400 for injecting fuel, according to aspects of the disclosure. A first step 402 of method 400 may include generating, with ECM 50, a first command 102 to actuate a first injector with an injector driver. For example, ECM 50 may generate voltage command 102 for actuating spill valve 20 of first fuel injector 12 with injector driver 52. This injector 12 may, during this actuation, contain fuel that is pressurized with the action of a camshaft contacting a piston of fuel injector 12.

As indicated above, command 102 may also actuate control valve 24 of second fuel injector 14, as solenoids 40 and 42 are connected in parallel. However, this actuation of control valve 24 does not result in the injection of fuel in injector 14. Injection does not occur because, in at least some configurations, injector 14 is installed in an engine cylinder that is 360 crankshaft degrees away from the cylinder of injector 12, and thus, the camshaft for injector 14 is not in a position to depress a piston of injector 14 and pressurized fuel is not present within injector 14.

A second step 404 of method 400 may include generating, with ECM 50, a second command 102 to actuate control valve 24 of first injector 12 with injector driver 54. This actuation of control valve 24 may inject fuel that was pressurized by actuating spill valve 20 in step 402. Also, during step 404, the spill valve 20 of second fuel injector 14 may be actuated, as solenoid 40 of injector 14 is electrically connected in parallel with solenoid 42 of injector 12. However, as described above, injector 14 does not contain pressurized fuel at this time, due to the location of the camshaft for the second fuel injector 14 (e.g., as injectors 12 and 14 are connected in cylinders that are more than about 135 crankshaft degrees and less than about 585 crankshaft degrees from each other).

A third step 406 of method 400 may include generating, with ECM 50, a third command 102 to actuate spill valve 20 of second injector 14 with injector driver 54. This third command 102 may cause spill valve 20 of second fuel injector 14 to close, in a manner similar to spill valve 20 of fuel injector 12. Command 102 may also actuate control valve 24 of injector 12. However, at this time, the camshaft for injector 12 may have moved away from a position that pressurizes fuel in injector 12. As such, command 102 of step 406 does not result in pressurization of fuel within injector 12.

A fourth step 408 of method 400 may include generating, with ECM 50, a fourth command 102 to actuate control valve 24 of second injector 14 with injector driver 54. As described above with respect to step 404, this actuation may inject fuel that was pressurized during step 406. Fourth command 102 may also actuate spill valve 20 of injector 12, but, as described above, this may not result in pressurization or injection of fuel in injector 12.

A fifth step 410 may be performed continuously or intermittently during method 400. During step 410, ECM 80 may monitor each fuel injector (e.g., injectors 12, 14) installed in an internal combustion engine to identify issues, such as faults, in particular spill and control valves of these injectors. For example, ECM 50 may be configured to monitor current rise times when command 102 is generated. ECM 50 may also be configured to monitor induced current peaks after command 102 is no longer generated.

With reference to FIG. 3, and as described above, the rise time of current that results from command 102 may be affected by the condition of solenoid 40, solenoid 42, or both. For example, when solenoids 40 and 42 operate normally, first rise time 312 may be observed. This rise time 312 may be identified based on a first predetermined time range stored in a memory of ECM 50. When control valve 24 operates normally but spill valve 20 experiences a fault, ECM 50 may observe second rise time 314. This rise time 314 may be identified based on a second predetermined time range stored in a memory of ECM 50. When spill valve 20 operates normally but control valve 24 experiences a fault, ECM 50 may observe third rise time 316. This rise time 312 may also be identified based on a third predetermined time range stored in a memory of ECM 50.

In response to identifying a fault in spill valve 20 or control valve 24 based on the above-described rise times, ECM 50 may take an action in response to this determination. For example, ECM 50 may generate a notification (e.g., a warning light, message to a mobile device, display on a screen within a machine, message to a service center computer system, etc.) that identifies the fault. This notification may also identify the cylinder, the fuel injector, and if desired, the valve that is associated with the fault. For example, if a fuel injector in the third cylinder experiences a spill valve fault, ECM 50 may communicate this cylinder, injector, and valve information to an operator of the machine and/or a supervisor for a plurality of machines. ECM 50 may also generate a notification when the peak of an induced current due to return of spill valve member 22 to the resting position indicates a fault. Additionally, ECM 50 may be configured to control timing of valve 20 for future injections based on this measurement.

While steps 402, 404, 406, 408, and 410 were described in an exemplary order, as understood, one or more of these steps may be performed in a different order, or in a partially- or fully-overlapping manner. Additionally, in the above-described example, injector 12 is described as the injector that performs a first fuel injection, followed by injector 14 which performs a second fuel injection. As understood, because injectors 12 and 14 are 360 crankshaft degrees apart from each other in firing order in at least some configurations, one or more other fuel injectors will inject fuel between steps 404 and 406. Additionally, in at least some aspects, step 410 is optional and may be omitted if desired.

In some aspects, the disclosed system and method may enable a single electronic control module to control and power engines with a relatively large number of fuel injectors, such as an engine with 16 fuel injectors, 20 fuel injectors, or more. The system may realize cost reduction by the reduction in the required number of control modules and the required number of injector drivers (e.g., by including half the number of injector drivers as compared to fuel injectors), and may improve reliability by avoiding the need to provide communication connections, which may become loose, damaged, or even severed, during operation. Each individual fuel injector may be monitored to detect faults, including fuel injectors that are connected electrically in parallel to each other.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. A fuel injection system, comprising:
- a first fuel injector having:
  - a first electronically-controlled valve, the first electronically-controlled valve being a spill valve; and
  - a first injection valve configured to inject fuel when the first electronically-controlled valve is actuated;
- a second fuel injector having:
  - a second electronically-controlled valve, the second electronically-controlled valve being a control valve; and
  - a second injection valve configured to inject fuel when the second electronically-controlled valve is actuated; and
- a single fuel injector driver configured to actuate the first electronically-controlled valve and the second electronically-controlled valve simultaneously, the simultaneous actuation resulting in fuel being injected by only one of the first and second fuel injectors.

2. The fuel injection system of claim 1, further comprising:
- a first solenoid that, when energized, actuates the first electronically-controlled valve; and
- a second solenoid that, when energized, actuates the second electronically-controlled valve.

3. The fuel injection system of claim 2, wherein the first solenoid and second solenoid are electrically connected in parallel to each other.

4. The fuel injection system of claim 3, wherein the first solenoid has a different inductance as compared to an inductance of the second solenoid.

5. The fuel injection system of claim 1, further comprising an electronic control module configured to identify a condition of the first electronically-controlled valve or the second electronically-controlled valve.

6. A fuel injection system, comprising:
- a first fuel injector having a spill valve and a control valve;
- a second fuel injector having a spill valve and a control valve;
- a fuel injector drive circuit electrically connected to the spill valve of the first fuel injector and to the control valve of the second fuel injector to supply current for both the spill valve and for the control valve; and
- an electronic control module configured to:
  - generate a command for energizing the fuel injector drive circuit, and
  - identify an abnormality in the first fuel injector or the second fuel injector based on energy supplied with the fuel injector drive circuit.

7. The fuel injection system of claim 6, wherein the abnormality corresponds to a short circuit condition or an open circuit condition of the first fuel injector or the second fuel injector.

8. The fuel injection system of claim 6, wherein the electronic control module is configured to identify the abnormality based on a current supplied with the fuel injector drive circuit.

9. The fuel injection system of claim 6, wherein the electronic control module is configured to identify the abnormality based on a rise time of current supplied with the fuel injector drive circuit.

10. The fuel injection system of claim 6, wherein the electronic control module is configured to identify the abnormality based on a detected return time for the spill valve or the control valve of the first fuel injector.

11. The fuel injection system of claim 6, wherein the command for energizing the fuel injector drive circuit causes the fuel injector drive circuit to supply energy for actuating a valve of the first fuel injector and a valve of the second fuel injector.

12. The fuel injection system of claim 6, wherein the command for energizing the fuel injector drive circuit causes the fuel injector drive circuit to supply energy for actuating the spill valve of the first fuel injector and the control valve of the second fuel injector.

13. A fuel injection method, comprising:
- causing an injection of fuel with a first fuel injector by:

generating a command to actuate a first valve of the first fuel injector with a first injector driver; and generating a command to actuate a second valve of the first fuel injector with a second injector driver; and causing an injection of fuel with a second fuel injector by:

generating a command to actuate a first valve of the second fuel injector; and generating a command to actuate a second valve of the second fuel injector, wherein the command to actuate the first valve or the command to actuate the second valve, of the second fuel injector, is generated with the first injector driver.

14. The fuel injection method of claim 13, wherein the first valve of the first fuel injector is a spill valve and the second valve of the second fuel injector is a control valve.

15. The fuel injection method of claim 14, wherein the spill valve and the control valve are electrically connected in parallel to each other.

16. The fuel injection method of claim 13, further including detecting a condition of the first fuel injector or the second fuel injector based on current supplied via the first injector driver.

17. The fuel injection method of claim 16, wherein the condition is detected based on a rise time of the current supplied via the first injector driver.

18. The fuel injection system of claim 1, wherein the first fuel injector is associated with a first cylinder of an engine, the second fuel injector is associated with a second cylinder of the engine, and the first and second cylinders of the engine are operating at more than about 135 crankshaft degrees and less than about 585 crankshaft degrees from each other.

19. The fuel injection system of claim 1, wherein the first fuel injector is associated with a first cylinder of an engine, the second fuel injector is associated with a second cylinder of the engine, and the first and second cylinders of the engine are operating at more than about 270 crankshaft degrees and less than about 450 crankshaft degrees from each other.

20. The fuel injection method of claim 13, wherein the first fuel injector is associated with a first cylinder of an engine, the second fuel injector is associated with a second cylinder of the engine, and operating the first and second cylinders of the engine at more than about 270 crankshaft degrees and less than about 450 crankshaft degrees from each other.

* * * * *